US007617987B2

(12) United States Patent
Tanaka et al.

(10) Patent No.: US 7,617,987 B2
(45) Date of Patent: Nov. 17, 2009

(54) READER/WRITER APPARATUS

(75) Inventors: Yoshinori Tanaka, Kodaira (JP); Osamu Furuya, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 11 days.

(21) Appl. No.: 11/417,245

(22) Filed: May 4, 2006

(65) Prior Publication Data

US 2006/0256028 A1 Nov. 16, 2006

(30) Foreign Application Priority Data

May 11, 2005 (JP) ............................ 2005-138823

(51) Int. Cl.
*G06K 19/05* (2006.01)

(52) U.S. Cl. ...................................... 235/492; 235/380

(58) Field of Classification Search ................. 235/492, 235/380, 487; 343/742, 867, 895, 743, 728, 343/729, 908, 747
See application file for complete search history.

(56) References Cited

U.S. PATENT DOCUMENTS 4,701,764 A * 10/1987 Malcombe .................. 343/742
5,914,692 A * 6/1999 Bowers et al. .............. 343/742
6,469,674 B1 * 10/2002 Podger ........................ 343/742
6,844,859 B2 * 1/2005 Noda et al. ................. 343/744
6,853,342 B2 * 2/2005 Podger ........................ 343/742
2002/0084940 A1 7/2002 Dettloff et al.

FOREIGN PATENT DOCUMENTS

| | | |
|---|---|---|
| JP | 10-209737 | 8/1998 |
| JP | 11-506279 | 6/1999 |
| JP | 2000-151257 | 5/2000 |
| JP | 2001-101352 | 4/2001 |
| JP | 2001-508260 | 6/2001 |
| JP | 2002-2917 | 1/2002 |
| JP | 2003-142927 | 5/2003 |
| JP | 2004-140513 | 5/2004 |
| JP | 2005-26989 | 1/2005 |
| WO | 2006/008705 | 1/2006 |

OTHER PUBLICATIONS

Notification of Reason for Refusal (in English language) issued Mar. 18, 2008.

* cited by examiner

*Primary Examiner*—Daniel St.Cyr
(74) *Attorney, Agent, or Firm*—Wenderoth, Lind & Ponack, L.L.P.

(57) ABSTRACT

A reader/writer apparatus uses an antenna to communicate contactlessly with an identifier, such as an IC tag or IC card. The antenna includes a plurality of linked antenna elements of identical or substantially identical shape. The antenna elements are asymmetrical with respect to an axis perpendicular to a direction of linkage.

7 Claims, 7 Drawing Sheets

READER/WRITER APPARATUS

BACKGROUND OF THE INVENTION

1. Field of the Invention

This invention relates to a reader/writer apparatus that is equipped with an antenna and communicates with an identifier such as an IC tag, particularly to a reader/writer that is equipped with an antenna that achieves a good communication state.

2. Description of the Prior Art

Contactless reader/writer systems using IC tags are commonly called RF-ID systems, and are applied in transportation systems, distribution management systems, inventory management systems, and so forth.

The main components of these systems are an IC tag equipped with an IC chip and loop antenna, and a reader/writer apparatus that is equipped with a loop antenna and performs wireless communications with the IC tag. By means of its loop antenna, the reader/writer apparatus transmits, continuously or intermittently, electric power to drive the IC chip of the IC tag and interrogation data, and obtains response data from an IC tag that is within receiving range of the electric power and interrogation data.

An RF-ID system will now be described, using as an example an electromagnetic induction type reader/writer apparatus that uses the 13.56 MHz frequency band.

For a contactless IC tag that does not contain a power supply to wirelessly communicate with an electromagnetic induction type reader/writer apparatus, the magnetic field generated by the transmission antenna in the reader/writer apparatus has to be spatially within a range in which it can generate the electromotive force to drive the circuit inside the IC tag and, in addition, has to have a positional relationship whereby it has a directional interlinkage to the loop plane of the loop antenna of the IC tag.

However, if it is assumed that, with respect to the loop antenna of the reader/writer apparatus, the IC tag is within an arbitrary, uniform planar or spatial read range that is adequately within the necessary distance for driving the IC tag, and the IC tag plane (loop antenna plane) is fixed in an arbitrary direction, the loop antenna of the reader/writer apparatus has one or more null points at which, with respect to the IC tag, the magnetic field disappears. Moreover, continuous null points form a linear, planar or three-dimensional region in which communication is impossible.

FIG. 6 is an example of a loop antenna 41 of a reader/writer apparatus, showing the direction of the magnetic field generated by the loop antenna 41, the plane direction of the IC tag 42 (direction of the plane of the IC tag loop antenna), and the null plane (continuous null points) at this time.

More specifically, a book management system, such as that used in a library, will be described as an example of an inventory management system that uses loop antennas on a plurality of shelves.

Affixed to each book is an IC tag with an IC chip on which is stored book management data. Book management data can include data relating to the book itself, such as title, author, category, and data on its lending history, such as the number of times it has been lent, and the periods of the loans. Each bookshelf has an antenna used by the reader/writer apparatus to communicate with the IC tag affixed to each book. The antennas of the IC tags and reader/writer apparatus are directional and are disposed for mutual suitability between IC tag antennas and shelf antennas. The system can be used to provide users with various services, such as searching for books on specific shelves, or searching for the location of a specific book, and so forth.

As long as there is mutual suitability between the directionality of the shelf antennas and the directionality of the IC tags on books arranged arbitrarily on the shelves, the read range is arranged for uniform read capability.

FIG. 7 shows an examplary configuration of a book management system comprising a bookcase 51, a bookshelf 52, a loop antenna (shelf antenna) 53 of a reader/writer apparatus on the bookshelf 52, and a book 54 with an IC tag 55. FIG. 7 also shows the direction of the magnetic field generated by the loop antenna 53, and the read range (in the plane of the loop antenna 53). When the IC tag 55 is affixed to the cover of the book 54 and the book 54 is arranged normally on the bookshelf 52, the direction of the magnetic field interlinking the IC tag 55 is the lateral direction of the bookshelf 52.

With the conventional square-shaped shelf antenna pattern, the range of the magnetic field generated in the desired lateral direction of the shelf is a limited portion of the side surface of the bookshelf, so it is not possible to read to the inside of the shelf antenna pattern, and therefore not possible to obtain a uniform read range on the shelf.

FIG. 8 shows an example of a loop antenna 53 used as an ordinary shelf antenna, the plane direction of an IC tag 55, and the ranges in which reading is possible and not possible with the loop antenna 53. Moreover, if the output of the reader/writer apparatus is increased in order to expand the read range, communication can be obstructed by shelf antennas above and below, or by other reader/writer apparatuses being operated adjacently or nearby. Also, in cases in which the intention is to read a plurality of IC tags in a shelf antenna all at once, it is difficult to uniformly form on the shelf a magnetic field having the necessary strength and directionality to read the information of all the IC tags.

Reference 1: Unexamined Patent Application Publication 2004-140513.

Thus, a problem with conventional book management systems and the like is that it is difficult to achieve a state of good communication between the reader/writer apparatus antenna and the IC tags. Therefore, when the IC tag 55 is fixedly oriented in the lateral direction of the bookshelf 52, as shown in FIG. 9, there is a need to be able to obtain a desired uniform read range over the whole surface of the bookshelf 52 by forming a magnetic field of uniform directionality and strength over the whole surface of the bookshelf 52. Even if the magnetic field is not as shown in FIG. 9, there is a need to be able to form a good read range that covers the whole of the bookshelf 52 surface.

In order to have the strength of the magnetic field generated by the loop antenna 53 increase the nearer it is to the antenna pattern, it is desirable to make the antenna pattern one that uniformly covers the whole of the bookshelf surface, as in the case of FIGS. 10(*a*) and (*b*), which shows examples of the strength and direction of magnetic fields generated by the loop antenna 53 in each case.

Also, when, as shown in FIG. 11, an antenna 61 is used that includes a pattern folded back inside the conventional loop shape, the peaks and valleys of the folds form null planes, making it all the more necessary to develop a well-shaped antenna.

Therefore, the object of the present invention is to provide a reader/writer apparatus equipped with an antenna that achieves a good communication state with an identifier such as an IC tag.

SUMMARY OF THE INVENTION

To attain the above object, the reader/writer apparatus according to this invention uses the antenna described below to wirelessly communicate with an identifier.

Specifically, the antenna comprises a lead wire formed into a plurality of linked antenna elements of identical or substantially identical shape. Also, in shape the antenna elements are asymmetrical with respect to an axis perpendicular to the direction of linkage.

Therefore, a good communication state can be achieved by means of the asymmetry with respect to the magnetic field generated by the antenna, or null points or null planes formed in the magnetic field.

Here, various items may be used as the identifier, such as for example an IC tag or IC card. A loop antenna, for example, is used as the identifier antenna, but any of various other shapes that are effective in practice may also be used.

Also, various reader/writer apparatuses may be used, such as one that communicates with an identifier affixed to a book via an antenna provided on a bookshelf, or one that communicates with identifiers affixed to other items, or one that communicates with an identifier such as an IC card carried by a person.

As the contactless communication, there may be used, for example, wireless communication using electromagnetic induction. Also, various shapes may be used for the shape of the antenna elements, and various numbers may be used as the number of the plurality of linked antenna elements.

In one configuration of the reader/writer apparatus of this invention, the antenna elements are constituted by combining wires that are not parallel to the direction of linkage, which makes it possible to achieve an antenna that does not generate a magnetic field perpendicular to the direction of linkage. When the antenna is actually formed of lead wire, there may be parts of it, or curved parts and the like, that are parallel to the direction of linkage. However, the invention encompasses cases in which some such portions are produced in practice.

In another configuration of the reader/writer apparatus, the antenna is provided on a rectangular plane, the plurality of antenna elements is linked in the direction of the length of the rectangle, and the plane of the identifier in which the loop antenna is provided is arranged perpendicular or substantially perpendicular to the direction of the length of the rectangle. This configuration makes it possible to achieve a good state of communication between the reader/writer apparatus antenna and the loop antenna of the identifier.

Examples of further configurations of the antenna of the reader/writer apparatus are described below.

At the junction points between adjacent antenna elements, the lead wire may be twisted, or not twisted. The configuration of the antenna elements may include wires perpendicular to the direction of linkage. The antenna elements may also be formed of wire that is perpendicular to the direction of linkage and wire that is diagonal to the direction of linkage (that is, wire that is neither parallel nor perpendicular to the direction of linkage).

The antenna elements may also have a shape that is triangular or substantially triangular, such as the shape of an isosceles triangle or substantially an isosceles triangle. The antenna elements may also be fan-shaped, pentagonal, semi-circular, semi-elliptic or of a shape similar to any of those. The antenna elements may also be configured as two identically shaped chevrons set in spaced opposition perpendicular to the direction of linkage with the apices of the two chevrons staggered in the direction of linkage.

As described in the foregoing, in accordance with the reader/writer apparatus of this invention, the antenna is configured for wirelessly communicating with an identifier and, with respect to the strength of the magnetic field generated by the antenna and the orientation towards null points or null planes formed in the magnetic field, enables good communication with the identifier antenna.

DESCRIPTION OF THE PREFERRED EMBODIMENT

The invention will now be specifically explained with reference to the drawings.

Figure 1:
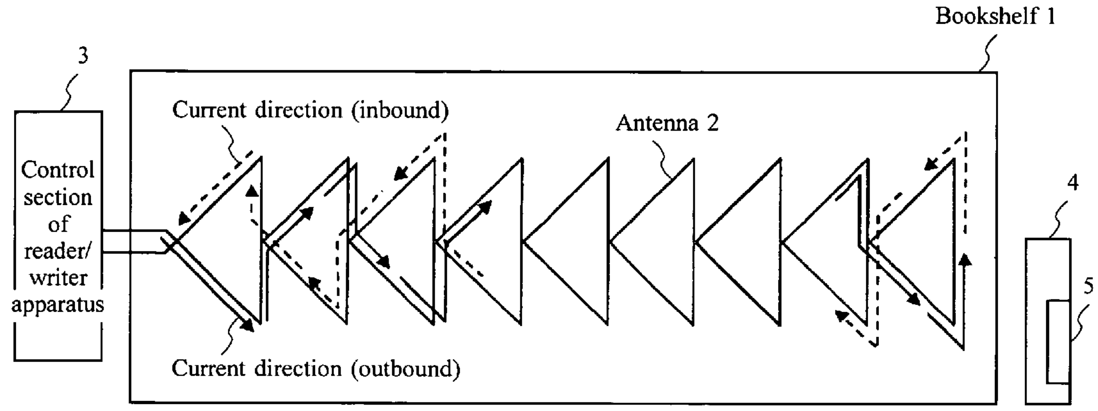
FIG. 1 is a diagram showing an example of the configuration of an antenna of a reader/writer apparatus according to an embodiment of the present invention.
Figure 7:
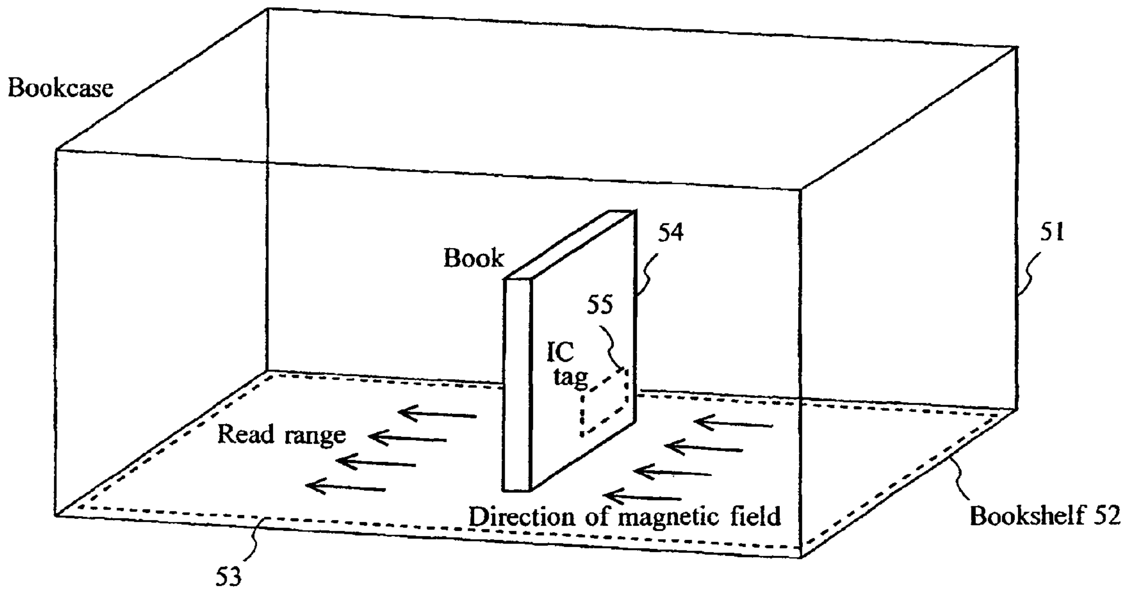
Fig.7 (PRIOR ART)
FIG. 7 is a diagram showing an example of a book management system.
Figure 8:
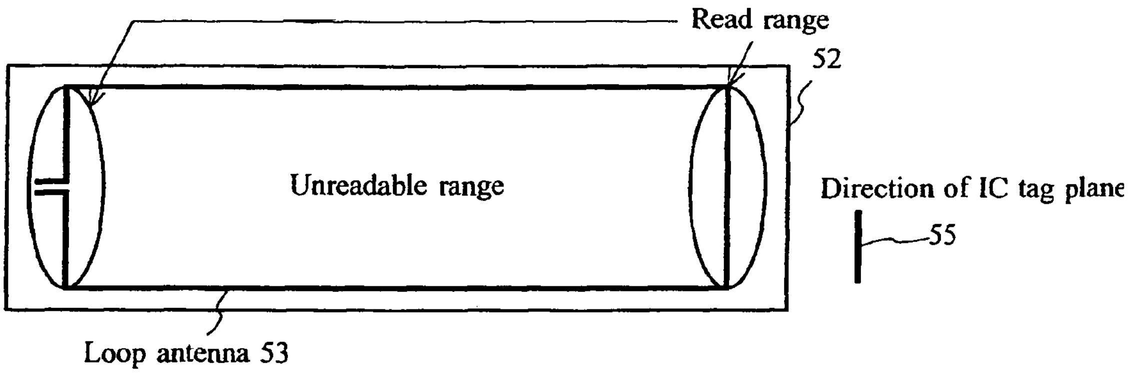
Fig.8 (PRIOR ART)
FIG. 8 is a diagram showing an example of the read and unreadable ranges of a loop antenna.
Figure 9:
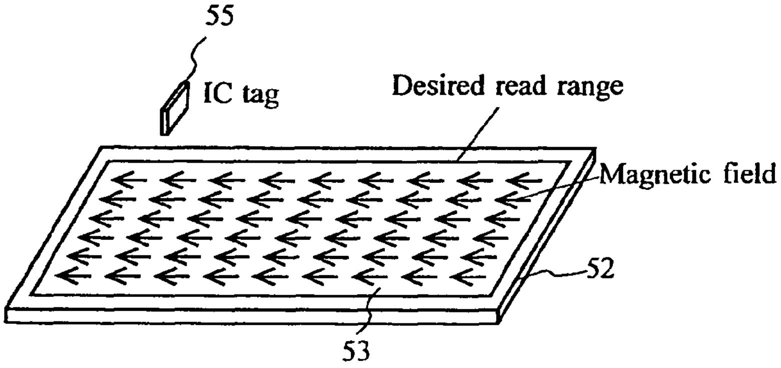
Fig.9 (PRIOR ART)
FIG. 9 is a diagram showing an example of a magnetic field for achieving a required read range.
Figure 10:
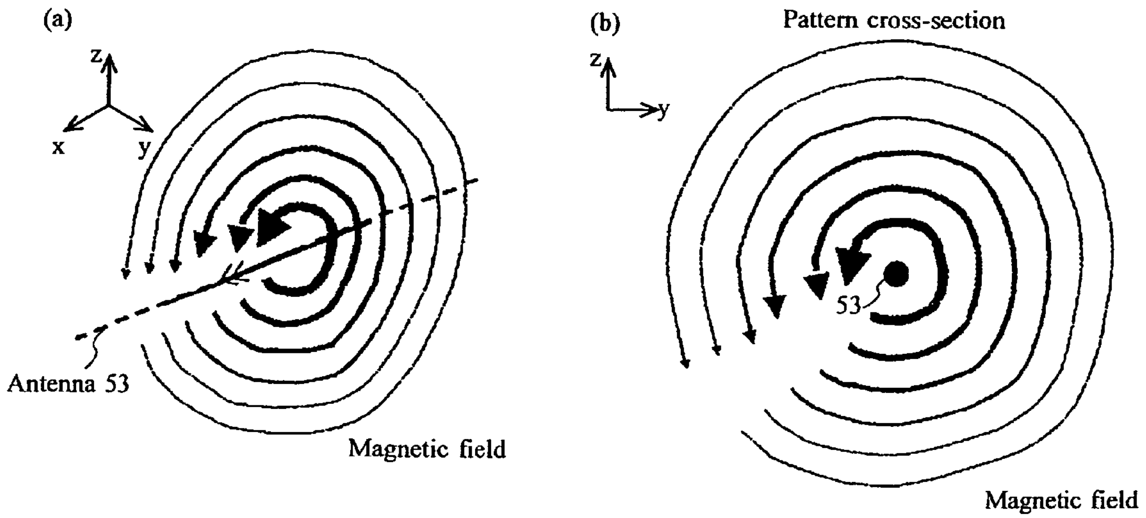
Fig.10 (PRIOR ART)
FIG. 10 is a diagram showing an example of the strength of a magnetic field generated by a loop antenna.
Figure 11:
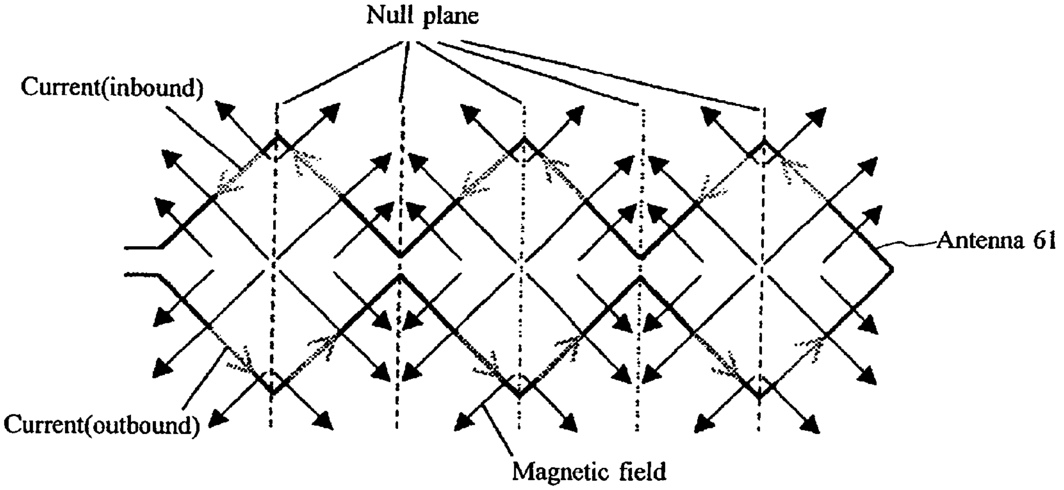
FIG. 11 is a diagram showing an example of null planes formed by the antenna of a reader/writer apparatus.

FIG. 1 shows the example of a book management system, showing mainly a reader/writer apparatus antenna 2 provided on a bookshelf 1. The system comprises the bookshelf 1, the reader/writer apparatus antenna 2 and the control section 3 of the reader/writer apparatus. Numeral 4 denotes a book, and 5 is an IC tag 5 housed in the book 4. Except for the shape of the antenna 2 and the magnetic field and read range thereof, the setup is substantially the same as the one shown in the three-dimensional view of FIG. 7.

In this example, the antenna 2 and control section 3 are connected together. Among the various functions possessed by the control section 3 are that of using the antenna 2 to contactlessly transmit electric power and interrogation data to the IC tag 5, using the antenna 2 to contactlessly receive response data transmitted from the IC tag 5, and storing various types of data.

The flat IC tag 5 is affixed to the front or back cover of the book 4, with the loop antenna of the IC tag 5 on the cover. The IC tag 5 has a loop antenna for receiving the electric power and interrogation data sent contactlessly from the antenna 2 and transmitting back data in response to the interrogation, memory for storing identification information, a control section for controlling communications, and so forth.

There is a more or less decided way of arranging the books 4 on the bookshelf 1, which is that the books are arranged in parallel along the shelf. As shown in FIG. 1, the plane of the loop antenna of the IC tag 5 is orthogonal or substantially orthogonal to the plane of the antenna 2 of the reader/writer apparatus. When the book 4 is in position on the bookshelf 1 and electric power is wirelessly transmitted from the antenna 2, the power supply of the IC tag 5 of the book 4 switches on. Then, interrogation data that is transmitted wirelessly from the antenna 2 is received by the IC tag 5. The IC tag 5 then transmits the response data, which is received by the reader/writer apparatus via the antenna 2, and processed by the control section 3.

The response data which includes, for example, identification information stored in the memory of the IC tag 5 is transmitted to the reader/writer apparatus. The reader/writer apparatus thus acquires the information on the book 4 to which the IC tag 5 is affixed, based on the identification information included in the response data.

Identification information comprising, for example, book title, author, category, and data on its lending history, such as the number of times it has been lent, and the periods of the loans, may be used as is. When there is not much storage capacity, number information may be used instead, with the number information corresponding to the various items of identification information being stored in an external database, for example. In such a case, the reader/writer control section 3 uses the identification information read from the IC tag 5 to reference and acquire the corresponding book information or the like in the external database.

The configuration of the antenna 2 of the reader/writer apparatus will now be explained.

As shown in FIG. 1, the antenna 2 is twisted into the shape of the antenna pattern to form a continuous plurality of identical loops on a single, rectangular plane, which in this case is the plane of the bookshelf 1. Each magnetic field generated by this antenna configuration has to be oriented so as to be predominantly orthogonal or substantially orthogonal to the plane of the IC tag 5 loop, forming an antenna pattern wherein no part of the magnetic field (which is lateral, with reference to FIG. 1) is parallel to the plane of the loop antenna of the IC tag 5. That is, nowhere is there a parallel relationship between the read direction of the IC tag 5 and the magnetic field.

Compared to a conventional antenna pattern, the antenna 2 thus configured substantially decreases the number of null planes that impede communication, and the composite magnetic field thus formed ensures a broader read range. In addition, viewed from the direction of the IC tag 5, null points in the magnetic fields generated by the antenna 2 can be distributed within the read range at locations that are relatively easy to avoid.

Figure 2:
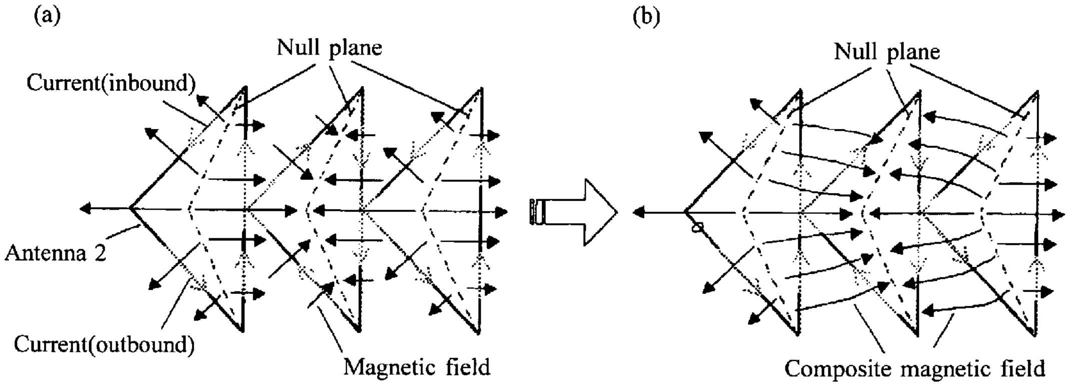
FIG. 2 is a diagram showing an example of the magnetic field generated by the antenna.

FIG. 2(*a*) shows an example of the direction of current flowing in the antenna 2 (outbound and inbound), the orientation of the magnetic field generated by the antenna 2, and the null planes formed. FIG. 2(*b*) shows an example of the composite result of combining the generated magnetic fields. Thus, each of the components of the antenna 2 can be made to uniformly generate a magnetic field in the same direction, fixing the IC tag 5 orientation and effectively ensuring the antenna read plane, for example.

Examples of configurations of the antenna of the reader/writer apparatus that provide an effect similar to that described above, including the configuration of the antenna 2 shown in FIG. 1, will now be described with reference to FIGS. 3 to 5.

In each case, the antenna comprises loops of the same shape arrayed continuously in the length direction of the rectangular bookshelf 11 (laterally, with reference to the drawings). The drawings also show examples of the orientation of the IC tag 12, the direction in which the current flows in the antenna (the directions shown by an arrow), and the null plane (indicated by a dotted line) of the magnetic field generated by the antenna. The number of loops constituting the antenna, the direction in which the loops are arrayed (right to left or left to right, with respect to the drawings), and the direction of current flow in the antenna may be set arbitrarily.

Figure 3:
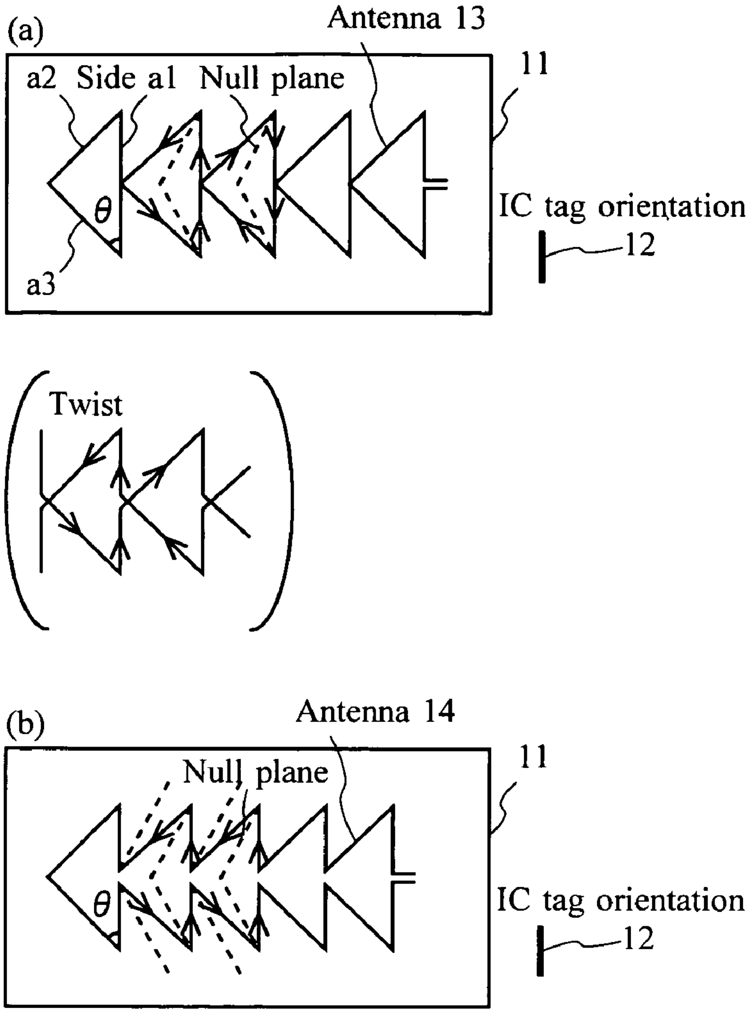
FIG. 3 is a diagram showing an example of an antenna shape.

FIG. 3(*a*) shows an example of the configuration of an antenna 13 similar to the one shown in FIG. 1. The antenna 13 is comprised of lead wire formed into a continuous array of identical or substantially identical triangular shapes. The lead wires of adjacent triangles are bent (twisted) to intersect each other, as shown by the direction of current flow. Each triangle consists of one side a1 that is parallel to the lateral plane of the bookshelf 11 and the plane of the IC tag 12, and two sides a2 and a3 that extend diagonally from respective ends of the side a1 and intersect at the apex.

In overall terms, a plurality of sides similar to the side a1 is arranged in parallel on the bookshelf 11, and in each case sides a2 and a3 similarly extend from the respective ends of the side a1 to a midpoint of the adjacent side. The diagonal nature of the sides a2 and a3 causes the null portions to also be diagonal with respect to the IC tag 12, and also contributes to the magnetic field. Also, in this example each of the triangles constituted by the three sides a1, a2 and a3 is an isosceles triangle. The angle shown in the drawings as $\theta$ should not be too large; an angle of around 45°, for example, is preferable.

FIG. 3(*b*) shows an example of a configuration of an antenna 14 in which the lead wire does not cross (is not twisted) at the junction between adjacent triangles. In the case of antenna 14, the direction in which the lead wire is bent at the respective apex (the point of intersection of sides a2 and a3) is opposite to that shown in FIG. 3(*a*), as indicated by the direction of current flow.

In the case of the configurations of both FIG. 3(*a*) and FIG. 3(*b*), a good state of communication can be achieved by the formation of a null plane that is diagonal, not parallel, to the IC tag 12. However, the configuration of FIG. 3(*a*) in which the lead wire is twisted is preferable, since it provides a stronger magnetic field, or the strength of the magnetic field is increased by the decrease in the null planes.

Figure 4:
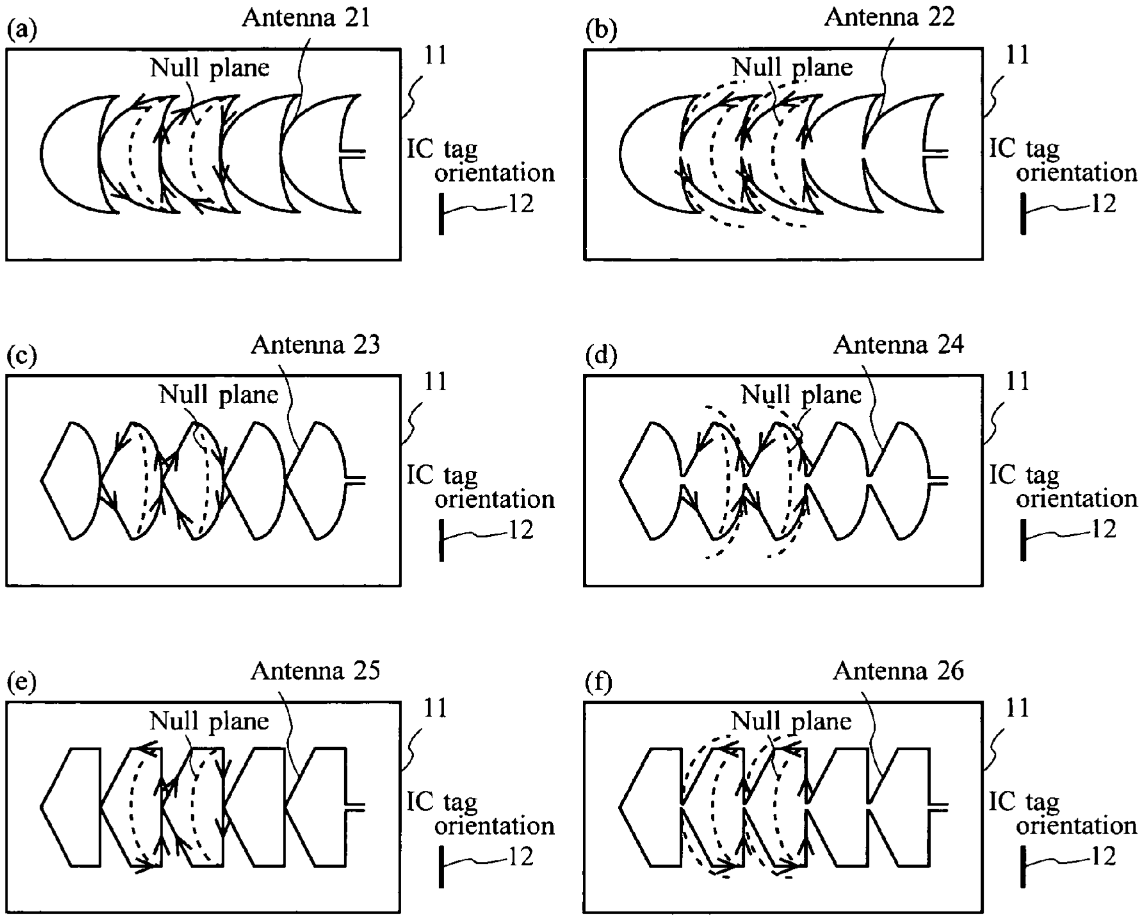
FIG. 4 is a diagram showing an example of an antenna shape.

Instead of the antenna configuration of FIG. 3(*a*) in which the lead wire is twisted to form triangles, FIG. 4(*a*) shows an example of the configuration of an antenna 21 in which each of the triangle sides a1, a2 and a3 is arched outwards in one direction (leftwards, in this example). As in the case of FIG. 3(*b*), FIG. 4(*b*) shows an example of a configuration of an antenna 22 in which the lead wire is not twisted. In the case of these antennas 21 and 22, also, the null plane (indicated by a dotted line) can be diagonal to the IC tag 12, and it is preferable to use the antenna 21 in which the lead wire is twisted.

Instead of the antenna configuration of FIG. 3(*a*) in which the lead wire is twisted to form triangles, FIG. 4(*c*) shows an example of the configuration of an antenna 23 in which side a1 of each triangle is arched outwards in one direction (rightwards, in this example) into the shape of a fan or the like. As in the case of FIG. 3(*b*), FIG. 4(*d*) shows an example of a configuration of an antenna 24 in which the lead wire is not twisted. In the case of these antennas 23 and 24, also, the null plane (indicated by a dotted line) can be diagonal to the IC tag 12, and it is preferable to use the antenna 23 in which the lead wire is twisted.

Instead of the antenna configuration of FIG. 3(*a*) in which the lead wire is twisted to form triangles, FIG. 4(*e*) shows an example of the configuration of an antenna 25 in which the lead wire is twisted to form pentagons. As in the case of FIG. 3(*b*), FIG. 4(*f*) shows an example of a configuration of an antenna 26 in which the lead wire is not twisted. In the case of these antennas 25 and 26, also, the null plane (indicated by a dotted line) can be diagonal to the IC tag 12, and it is preferable to use the antenna 25 in which the lead wire is twisted.

Figure 5:
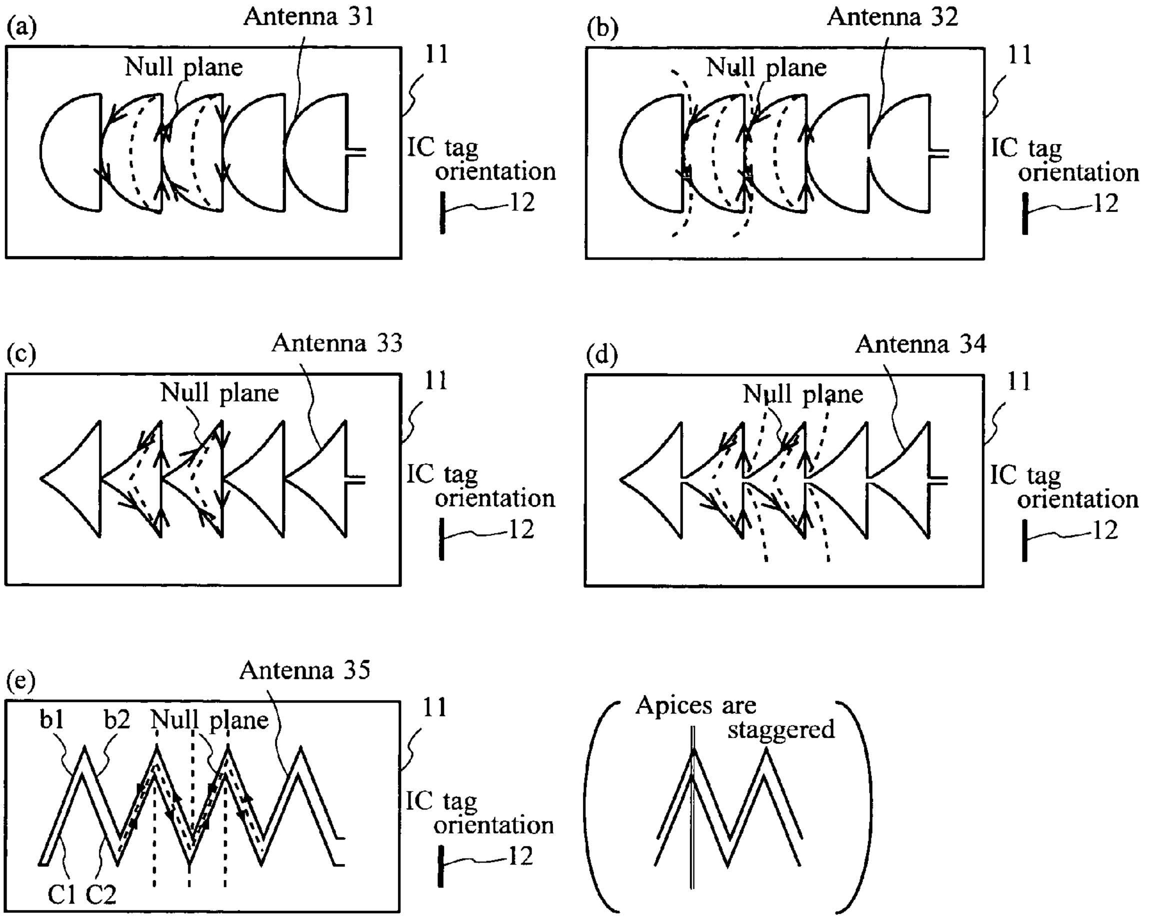
FIG. 5 is a diagram showing an example of an antenna shape.
Figure 6:
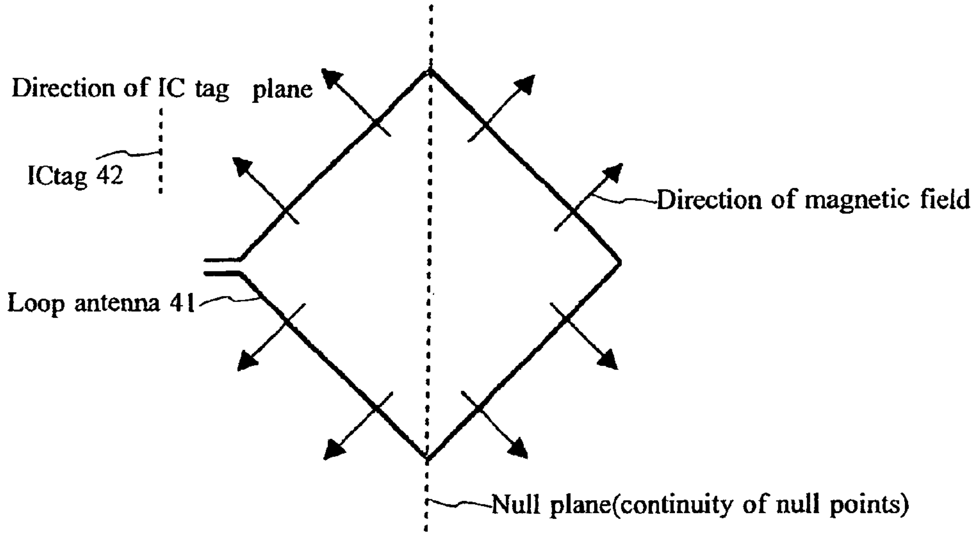
FIG. 6 is a diagram showing an example of a null plane formed by the loop antenna of a reader/writer apparatus.

Instead of the antenna configuration of FIG. 3(*a*) in which the lead wire is twisted to form triangles, FIG. 5(*a*) shows an example of the configuration of an antenna 31 in which the lead wire is twisted to form semicircular or semi-elliptic shapes. As in the case of FIG. 3(*b*), FIG. 5(*b*) shows an example of a configuration of an antenna 32 in which the lead wire is not twisted. In the case of these antennas 31 and 32, also, the null plane (indicated by a dotted line) can be diagonal to the IC tag 12, and it is preferable to use the antenna 31 in which the lead wire is twisted.

Instead of the antenna configuration of FIG. 3(*a*) in which the lead wire is twisted to form triangles, FIG. 5(*c*) shows an example of the configuration of an antenna 33 in which each of the triangle sides a2 and a3 is arched inwards. As in the case of FIG. 3(*b*), FIG. 5(*d*) shows an example of a configuration of an antenna 34 in which the lead wire is not twisted. In the case of these antennas 33 and 34, also, the null plane (indicated by a dotted line) can be diagonal to the IC tag 12, and it is preferable to use the antenna 33 in which the lead wire is twisted.

FIG. 5(*e*) shows an example of a configuration of an antenna 35 formed using lead wire. Specifically, the antenna 35 comprises a plurality of identically-shaped chevrons, each comprised of two sides b1 and b2, spaced perpendicularly to the longitudinal direction of the bookshelf 11 (vertically, in the drawing) and also staggered in the longitudinal direction of the bookshelf 11 (laterally, in the drawing). One chevron comprised of sides b1 and b2 is opposed to the other chevron comprised of sides c1 and c2 in the direction of the short side of the bookshelf 11 (the vertical direction in the drawing), and the apices of the two chevrons are staggered in the lengthwise direction of the bookshelf 11. In the case of this antenna 35 too, the null planes (indicated by a dotted line) can be diagonal to the IC tag 12.

As described in the above, this example comprises a book management system using a reader/writer apparatus in which the antenna is in the form of an array of a plurality of loops of identical shape. Each loop is formed to be asymmetrical in a direction perpendicular to the plane of the IC tag (the lateral direction, in FIGS. 1 to 5). The antenna thus formed comprises a continuously-connected series of antenna elements (identical loops, in this example) having an asymmetrical shape with respect to an axis perpendicular to the direction of linkage (the axis of the bookshelf plane, in this example), forming a configuration that avoids the formation of null planes that are parallel to the plane of the IC tag.

When the above book management system has an IC tag that is activated by a signal from the electromagnetic induction type reader/writer apparatus, in the case of this antenna configuration, when the loop antenna of the IC tag and the antenna of the reader/writer apparatus are in an orthogonal, or substantially orthogonal, position relationship, it is possible to increase the plane or spatial range over which the induction signal sent from the reader/writer apparatus can be received at a desired bearing by the IC tag and a response transmitted.

Therefore, when the reader/writer apparatus uses a shelf antenna with the bookshelf plane as the read range constituted by the magnetic field generated more or less uniformly in the lateral direction of the bookshelf, there is an absence of vertical null planes. This makes it possible to expand the area over which signals can be sent to, and received from, an IC tag, and also allows such communications to be expanded to enable simultaneous communication with a plurality of IC tags.

While the above example has been described with respect to a book management system, the invention can also be applied to systems for managing other items to which IC tags have been affixed. Also, while the above example has been described with respect to an IC tag, the invention can also be applied to an IC card or the like.

The configurations of the reader/writer apparatus as well as those of the identifier or identifier management system according to the present invention are not necessarily limited to those described in the foregoing, and various other configurations may also be used. Moreover, the present invention can be provided as, for example, methods or systems that execute processing in accordance with the present invention, and programs to realize such methods or systems, and recording media that records said programs, and can also be provided as various apparatuses or systems.

The field of application of the invention similarly is not limited to that described in the foregoing; instead, the invention can be applied to various fields.

In addition, the various types of processing performed in the reader/writer apparatus, identifier or identifier management system of the present may be constituted by being implemented in hardware resources equipped with a processor and memory and the like controlled, for example, by means of the processor executing a control program stored in ROM (Read Only Memory), and the various functional means for executing this processing may also be constituted as independent hardware circuits.

The present invention may also be understood as one -wherein the above control program is stored on a Floppy® disc, CD (Compact Disc)-ROM or other computer-readable recording media, so that the processing according to the present invention can be implemented by the control program being input from the recording media into a computer and executed by a processor.

What is claimed is:

1. A reader/writer apparatus for communicating with an IC chip of an object to be identified, the reader/writer apparatus including a loop antenna for communicating contactlessly by electromagnetic induction with the IC chip and transmitting electric power to drive the IC chip, wherein:

the loop antenna comprises a lead wire formed into a plurality of linked antenna elements of identical or substantially identical shape, the loop antenna is provided on a rectangular planar member, and the plurality of antenna elements are linked in a longitudinal direction of the rectangular planar member;

the plurality of antenna elements are linked in one direction;

the lead wire of the loop antenna crosses over itself at intersection points between adjacent antenna elements;

each of the antenna elements is constituted by a combination of wire portions, and all of the wire portions forming the antenna elements are nonparallel to the linkage direction of the plurality of antenna elements; and the adjacent antenna elements are asymmetrical to each other relative to the respective intersection point.

2. The reader/writer apparatus as claimed in claim 1, wherein each of the antenna elements is asymmetrical with respect to an axis that is perpendicular to the direction of linkage.

3. The reader/writer apparatus as claimed in claim 1, wherein the antenna elements form an array of identical or substantially identical triangular shapes.

4. A contactless reader/writer system equipped with a reader/writer apparatus that uses a loop antenna to communicate contactlessly by electromagnetic induction with an IC chip of an object to be identified, the loop antenna being operable to transmit electric power to drive the IC chip of the object to be identified, wherein:

the loop antenna comprises a lead wire formed into a plurality of linked antenna elements of identical or substantially identical shape;

the plurality of antenna elements are linked in one direction on a rectangular planar member, and the plurality of antenna elements are linked in a longitudinal direction of the rectangular planar member;

the lead wire of the loop antenna crosses over itself at intersection points between adjacent antenna elements;

each of the antenna elements is constituted by a combination of wire portions, and all of the wire portions forming the antenna elements are nonparallel to the direction of linkage of the plurality of antenna elements; and the adjacent antenna elements are asymmetrical to each other relative to the respective intersection point.

5. The reader/writer apparatus as claimed in claim 4, wherein the antenna elements form a continuous array of identical or substantially identical triangular shapes, and each of the triangular shapes includes one side that is parallel to a lateral direction of the rectangular planar member and two diagonal sides that extend from opposite ends of the one side and intersect at an apex of the triangular shape.

6. A loop antenna for a reader/writer apparatus, the loop antenna being operable to communicate contactlessly by electromagnetic induction with an object to be identified and transmit electric power to drive an IC chip of the object, the loop antenna comprising a lead wire formed into a plurality of linked antenna elements of identical or substantially identical shape, the plurality of antenna elements being linked in one linkage direction on a rectangular planar member, and the plurality of antenna elements are linked in a longitudinal direction of the rectangular planar member, wherein the lead wire of the loop antenna crosses over itself at intersection points between adjacent antenna elements, wherein each of the antenna elements is constituted by a combination of wire portions, and all of the wire portions forming the antenna elements are nonparallel to the linkage direction of the plurality of antenna elements, and wherein the adjacent antenna elements are asymmetrical to each other relative to the respective intersection point.

7. A reader/writer apparatus for communicating with an IC chip of an object to be identified, the reader/writer apparatus including a loop antenna for communicating contactlessly by electromagnetic induction with the IC chip and transmitting electric power to drive the IC chip, wherein:

the loop antenna comprises a lead wire formed into three or more linked antenna elements of identical or substantially identical shape;

the plurality of antenna elements are linked in one linkage direction;

the lead wire of the loop antenna crosses over itself at intersection points between adjacent antenna elements;

each of the antenna elements is constituted by a combination of wire portions, and all of the wire portions forming the antenna elements are nonparallel to the linkage direction of the plurality of antenna elements, and the adjacent antenna elements, relative to the intersection point, are asymmetric to each other.

* * * * *